United States Patent
Barave et al.

(10) Patent No.: US 8,107,403 B2
(45) Date of Patent: Jan. 31, 2012

(54) METHOD AND APPARATUS FOR UNICAST AND MULTICAST MEDIA PROCESSING

(75) Inventors: Amit P. Barave, Sunnyvale, CA (US); Leila A. Al-Muhtasib, San Jose, CA (US); Shmuel Shaffer, Palo Alto, CA (US); Charles U. Eckel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 12/188,993

(22) Filed: Aug. 8, 2008

(65) Prior Publication Data

US 2010/0034201 A1 Feb. 11, 2010

(51) Int. Cl.
*H04L 12/16* (2006.01)
*H04Q 11/00* (2006.01)
(52) U.S. Cl. .......................... 370/260; 370/252; 370/390
(58) Field of Classification Search .................. 370/338, 370/401, 390, 260, 261, 262, 252, 392, 432, 370/466, 389, 391; 709/204; 379/88.17; 455/416
See application file for complete search history.

(56) References Cited

U.S. PATENT DOCUMENTS

| | | | | |
|---|---|---|---|---|
| 5,963,547 | A * | 10/1999 | O'Neil et al. .................. | 370/260 |
| 6,404,745 | B1 * | 6/2002 | O'Neil et al. .................. | 370/260 |
| 7,079,495 | B1 * | 7/2006 | Pearce et al. ................... | 370/260 |
| 7,580,375 | B1 * | 8/2009 | Friedrich et al. ............... | 370/260 |
| 7,657,644 | B1 * | 2/2010 | Zheng ........................... | 709/231 |
| 7,668,907 | B1 * | 2/2010 | Janakiraman et al. ......... | 709/204 |
| 2002/0126626 | A1 * | 9/2002 | Singh et al. .................... | 370/260 |
| 2004/0194143 | A1 * | 9/2004 | Hirose ............................ | 725/97 |
| 2006/0104275 | A1 * | 5/2006 | Dohm ............................ | 370/390 |
| 2006/0146735 | A1 * | 7/2006 | Shaffer et al. ................. | 370/260 |
| 2007/0036118 | A1 * | 2/2007 | Shaffer et al. ................. | 370/338 |
| 2007/0109978 | A1 * | 5/2007 | Miriyala et al. ............... | 370/260 |
| 2007/0280298 | A1 * | 12/2007 | Hearn et al. ................... | 370/498 |
| 2007/0297460 | A1 * | 12/2007 | Muneishi et al. .............. | 370/516 |
| 2008/0084831 | A1 * | 4/2008 | Sylvain ......................... | 370/260 |
| 2008/0181140 | A1 * | 7/2008 | Bangor et al. ................. | 370/261 |
| 2009/0052450 | A1 * | 2/2009 | Mockett ........................ | 370/390 |
| 2009/0205008 | A1 * | 8/2009 | Wollmershauser et al. .. | 725/131 |
| 2009/0231415 | A1 * | 9/2009 | Moore et al. .................. | 348/14.09 |
| 2009/0312045 | A1 * | 12/2009 | Miller et al. .................. | 455/519 |

OTHER PUBLICATIONS

First experimental demonstration of combined multicast and unicast video streaming over an optical label switching network, 2006, Junqiang Hu et al.*

* cited by examiner

*Primary Examiner* — Chuong T Ho
(74) *Attorney, Agent, or Firm* — Schwegman, Lundberg & Woessner, P.A.

(57) ABSTRACT

A method and apparatus for unicast and multicast media processing is provided. The method may comprise receiving multicast packets communicating a plurality of media streams from a plurality of communication endpoints. Each communication endpoint may have an associated individual media stream. The method inspects the multicast packets to identify each individual media stream with which the packet is associated and individually processes each individual media stream. At least one individual media stream is unicast from its associated buffer to a unicast communication endpoint of the plurality of communication endpoints. In an example embodiment, the method may identify media capabilities of the unicast communication endpoint. The plurality of media streams may form part of a virtual talk group (VTG) in an audio conference.

30 Claims, 8 Drawing Sheets

METHOD AND APPARATUS FOR UNICAST AND MULTICAST MEDIA PROCESSING

FIELD

The present disclosure relates generally to communication systems. In an example embodiment, the disclosure relates to media conferencing (e.g., audio conferencing) in a communication network including both unicast and multicast communication endpoints.

BACKGROUND

In general, a communication system is a collection of communications networks, transmission systems, relay stations, tributary stations, and data terminal equipment usually capable of interconnection and interoperation to form an integrated whole. Communication devices may communicate media streams from different participants in a media conference such as an audio conference.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to one skilled in the art that embodiments of the inventive subject matter may be practiced without these specific details. In general, well-known instruction instances, protocols, structures, and techniques have not been shown in detail.

Overview

A method and apparatus for unicast and multicast media conferencing is provided. The method may comprise receiving multicast packets communicating a plurality of media streams from a plurality of communication endpoints. Each communication endpoint may have an associated individual media stream. The method inspects the multicast packets to identify each individual media stream with which the packet is associated and individually buffers each individual media stream. At least one individual media stream is unicast from its associated buffer to a unicast communication endpoint of the plurality of communication endpoints. In an example embodiment, the method may identify media capabilities of the unicast communication endpoint. The plurality of media streams may form part of a virtual talk group (VTG) in an audio conference.

Example Embodiments

Figure 1:
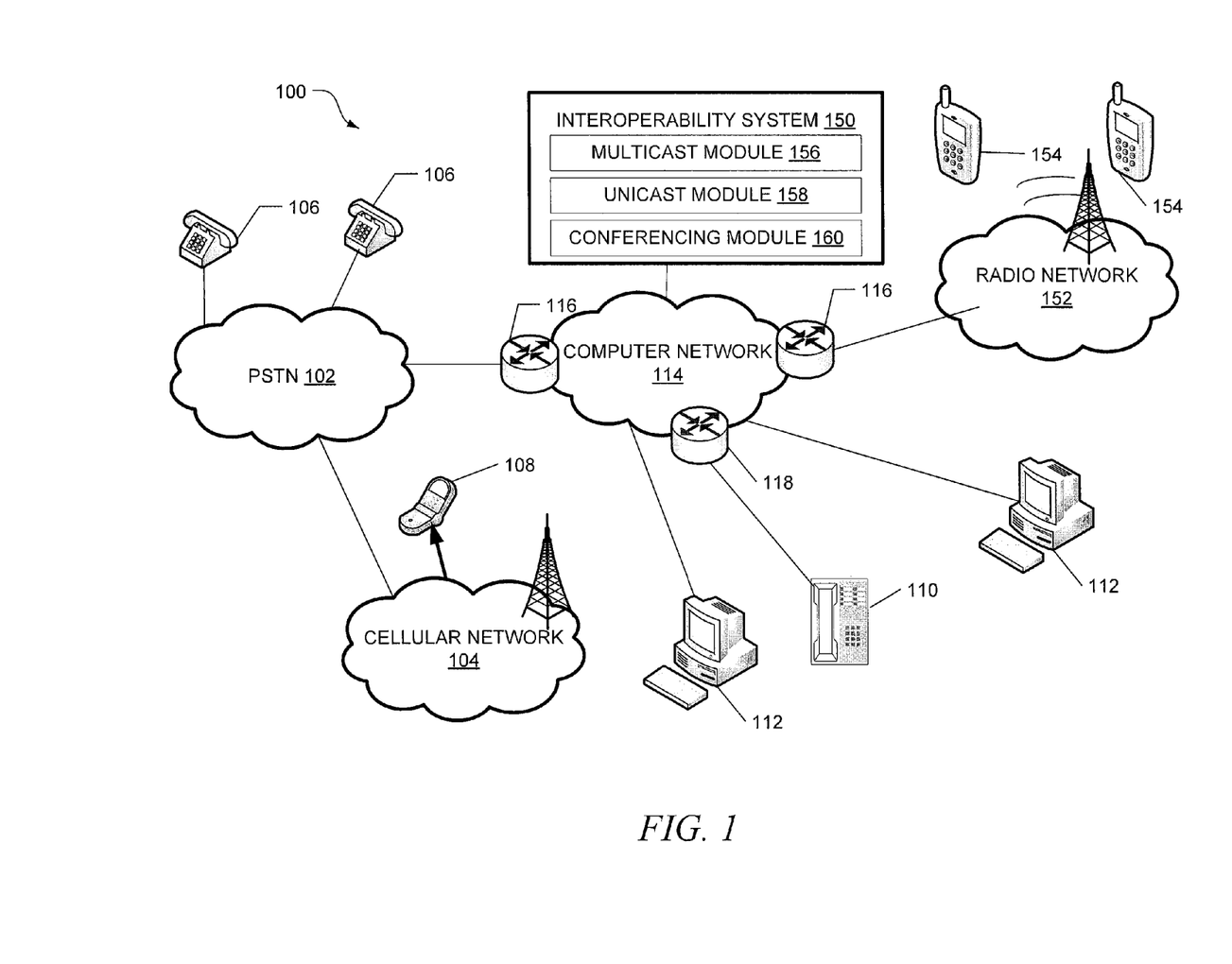
FIG. 1 depicts a simplified diagram of a communication system, in accordance with an example embodiment, including both full- and half-duplex communication devices.

FIG. 1 depicts a simplified diagram of a communication system 100, in accordance with an example embodiment, including both full- and half-duplex communication devices. The communication system 100 is shown by way of example to include a public switched telephone network (PSTN) 102, a cellular network 104, and various networked communication devices. Examples of communication devices include telephones 106, mobile phones 108, Voice over Internet Protocol (VoIP) phones 110, computers 112, gateways 116, routers 118, switches, transmission systems, relay systems, and other communication devices.

The communication system 100 further includes a radio network 152 configured to communicate with one or more mobile communication devices (e.g., push-to-talk (PTT) radios 154). The communication system 100 may thus include full-duplex communication devices (e.g., the telephones 106, the mobile phones 108, the VoIP phones 110 and the computers 112), as well as half-duplex communication devices (e.g., the PTT radios 154). Accordingly, an interoperability system 150 is provided to facilitate communication in the communication system 100 between unicast communication endpoints and multicast communication endpoints. The interoperability system 150 may include a variety of software applications and/or hardware that can monitor and process communications between the communication devices. In an example embodiment, the interoperability system 150 includes a multicast module 156 to facilitate multicast communications, a unicast module 158 to facilitate unicast communications and a conferencing module 160 to facilitate a media conference (e.g., a multimedia conference such as an audio and/or video conference).

In general, the computer network 114 is a collection of interconnected computing devices that communicate using wired or wireless mediums. Examples of computer networks, such as the computer network 114, include Local Area Networks (LANs) and/or Wide Area Networks (WANs), such as the Internet. It should be understood that a communication endpoint, as referred to herein, includes any equipment used in communication and associated with, or attached to, a communication network.

The PSTN 102 may include a Plain Old Telephone System (POTS). The PSTN 102 includes a collection of interconnected systems operated by telephone companies. The PSTN 102 may, for example, include the telephones 106, switches, and other systems and elements. The PSTN 102 may communicate with the computer network 114 via a gateway 116. The gateway 116 may provide voice multimedia and signaling interoperability between computer and non-computer networks, such as the PSTN 102, by bridging telephone transmissions to Internet Protocol (IP) streams.

The PSTN 102 is also shown to communicate with the cellular network 104. The cellular network 104 includes a type of radio network with a full-duplex system. Examples of the cellular network 104 include code division multiple access (CDMA), time division multiple access (TDMA), and other cellular networks. The mobile phones 108 may communicate via the cellular network 104.

As illustrated by way of example in FIG. 1, the interoperability system 150 may host the multicast module 156, the unicast module 158 and the conferencing module 160. As explained in more detail below, the multicast module 156 may de-multiplex media streams communicated in multicast packets to provide individual media streams which may then be individually buffered (e.g., each individual media stream may be stored in a separate logical memory space). Accordingly, in an example embodiment, control in a multimedia conference (e.g., an audio conference) of each individual media stream may be facilitated. When the media streams are audio streams, as described herein by way of example, the individual audio streams, derived from multicast packets, may be fed separately into a unicast audio conference device using audio conferencing techniques know in the art. Further, individual media streams communicated in multicast packets can be recorded individually as opposed to recoding a combined media stream where communications from conference participants are stored as a single mixed media stream.

The interoperability system 150 can be hosted on one or more server computers and may be configured to facilitate communication of media streams on a plurality of communication channels. An example of the interoperability system 150 is the IP Interoperability and Collaboration System (IP-ICS) network available from Cisco Systems of California that facilitates communication interoperability amongst different communication paradigms. A communication paradigm (or a communication modality) includes a mode of communication amongst a collection of interrelated communication devices. The communication paradigm can be distinguished by data format, type of signal, physical link or infrastructure, or other communication characteristics (e.g., half-duplex or full-duplex communications). For example, the communication system 100 may facilitate communication between the PTT radios 154 (e.g., ultra high frequency (UHF) radios, very high frequency (VHF) radios, and other push-to-talk radios) via the radio network 152 and telephony endpoints (e.g., the telephones 106) of the PSTN 102. In another example embodiment, the communication system 100 can facilitate communication between the push-to-talk radio 154 of the radio network 152 and the VoIP phones 110 or a software client residing on the computers 112. The communication system 100 may control the media and signaling of radio and VoIP systems, resulting in a direct communication between the different communication devices (e.g., between the PTT radios 154 and the VoIP phones 110).

It should be appreciated that radio network 152 may be a collection of communication devices that communicate over radio waves, such as ultra high frequency (UHF) and very high frequency (VHF) radio waves. The radio network 152 includes, for example, a land-mobile-radio (LMR) network. Examples of communication devices included in radio network 152 include the PTT radios 154 (e.g., UHF radios, VHF radios, and other radio network-based communication devices). It should be noted that PTT radios 154 or other communication devices included in radio network 152 may be push-to-talk radios that operate in half-duplex mode, which is in contrast to the communication devices (e.g., the telephones 106) that operate in full-duplex mode. A half-duplex system provides for communication in both directions, but only one direction at a time (not simultaneously). A full-duplex system allows communication in both directions, and unlike half-duplex communications, allows these communications to take place simultaneously. The radio network 152 may communicate with the computer network 114 by way of a gateway 116, which provides voice and control interoperability between the radio network 152 and the computer network 114 by bridging media and control transmissions to IP multicast and/or unicast (e.g., Session Initiation Protocol (SIP)) streams.

IP multicast data is broadcast to multiple receivers. Source endpoints and receiving endpoints send and receive data (e.g., packets communicating media streams) using an IP multicast group address. Data intended for multiple receiving endpoints is transmitted within a single stream. Source endpoints use the group address as the IP destination address in their data packets. Receiving endpoints use this group address to inform the network that they are interested in receiving packets sent to that group. Receiving endpoints may join a group using Internet Group Management Protocol (IGMP). In unicast communications data is sent to a single destination. For example, users in a SIP network are identified by unique IP addresses.

Figure 2:
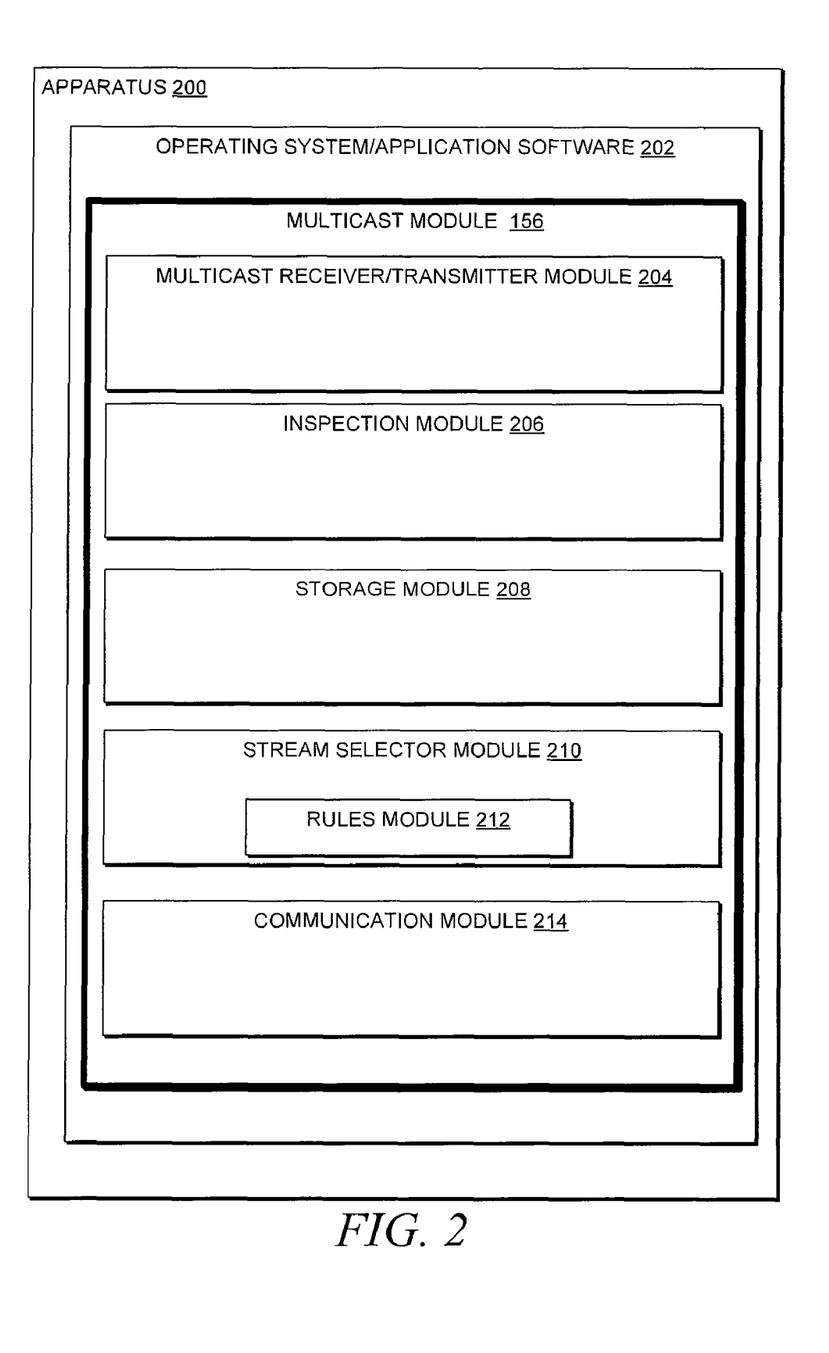
FIG. 2 depicts a block diagram of an apparatus, in accordance with an example embodiment, to de-multiplex media streams communicated in multicast packets into individual media streams.

FIG. 2 depicts a block diagram of an apparatus 200, in accordance with an example embodiment, to de-multiplex media streams communicated in multicast packets into individual media streams. The apparatus 200 may be deployed in the communication system 100 and, accordingly, is described by way of example with reference thereto.

The apparatus 200 includes memory for storing an operating system and application software 202 that, when executed, performs the methodologies described herein. Further, the apparatus 200 includes a multicast module 156 including a multicast receiver/transmitter module 204, an inspection module 206, a storage module 208 (e.g., providing buffer), a stream selector module 210, a rules module 212, and a communication module 214. The multicast receiver/transmitter module 204 is configured to receive IP multicast communications in an IP network and the communication module 214 is configured to communicate individual media streams to one or more media processing devices. As described by way of example in more detail below, the apparatus 200 de-multiplexes media streams communicated in multicast packets into individual media streams that may then be buffered individually (e.g., buffered in the same logical buffer or in different physical buffers). In an example embodiment, the multicast module 156 may form part of any conferencing system that hosts a VTG. Operation of the apparatus 200 is described by way of example below with reference to the communication system 100.

Figure 3:
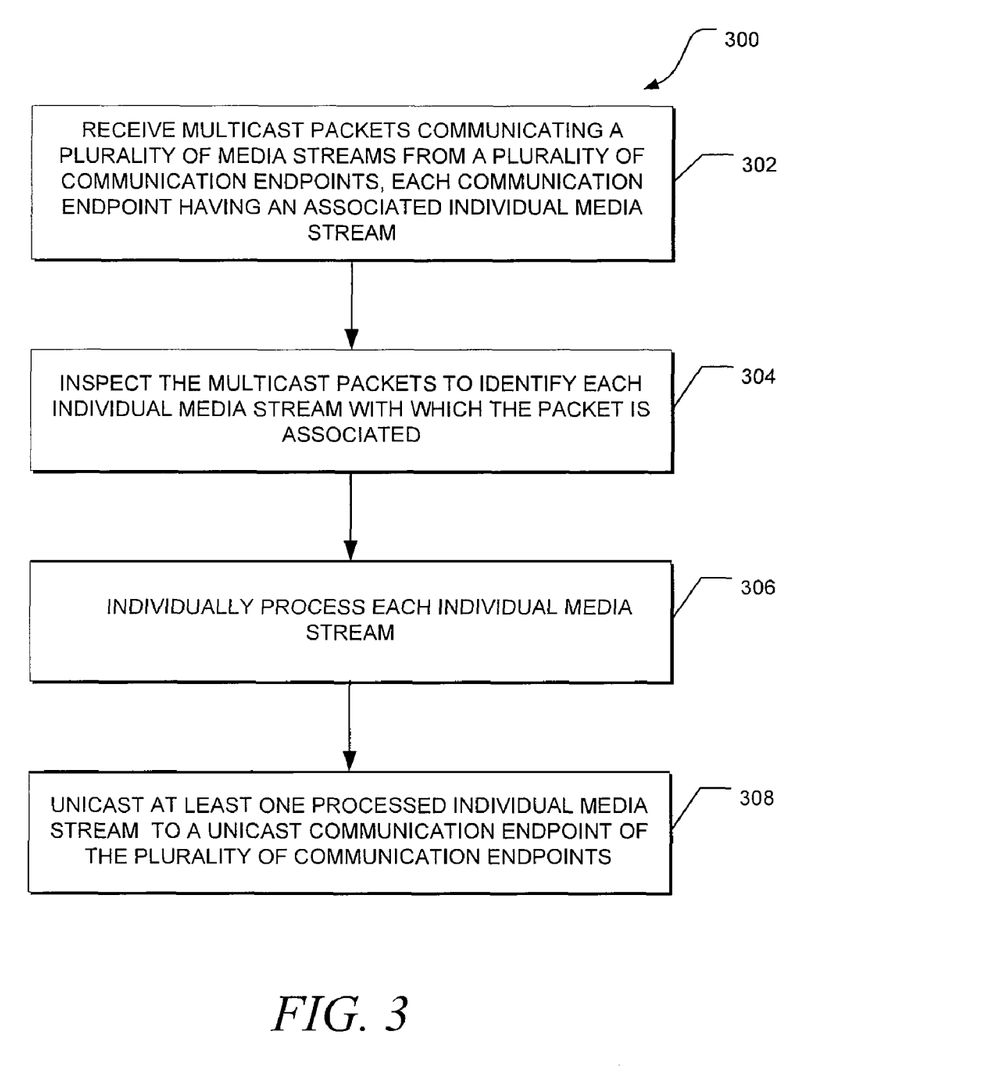
FIG. 3 depicts a flow diagram of a general overview of a method, in accordance with an example embodiment, for de-multiplexing media streams communicated in multicast packets into individual media streams.

FIG. 3 depicts a flow diagram of a general overview of a method 300, in accordance with an example embodiment, for de-multiplexing media streams communicated in multicast packets into individual media streams. In an example embodiment, as described further below, the media streams may be audio streams in a communications system including both multicast and unicast communication endpoints.

As shown at block 302, the method 300 may include receiving multicast packets communicating a plurality of media streams from a plurality of communication endpoints over a given multicast address, each communication endpoint having an associated individual media stream. For example, the endpoints may be the telephones 106, the mobile phones 108, the VoIP phones 110, the computers 112, and the PTT radios 154, shown in FIG. 1. At least some of the communication endpoints (e.g., the VoIP phones 110, VoIP applications running on the computers 112) may be multicast communication endpoints that communicate via the computer network 114, shown in FIG. 1, using the IP multicast protocol. Similarly the media streams from the telephones 106 and mobile phones 108 may be converted by gateway 116 into either multicast or unicast media streams.

As shown at block 304, the received multicast packets from a given multicast address are then inspected to identify each individual media stream with which the packet is associated. Thus, multiplexed media streams from a plurality of different communication endpoints received over a given multicast address may be de-multiplexed into individual media streams. Thereafter, as shown at block 306, the individual media streams may be processed individually. Possessing the individual media streams separately may include assigning a separate logical buffer in memory to each individual media stream so that packets associated with a particular media stream are stored in the same logical buffer. Accordingly, multiplexed media streams received from a plurality of communication endpoints using a multicast protocol may be de-multiplexed into individual media streams that are then processed (e.g., stored) separately. As shown at block 308, at least one individual media stream from its associated buffer may be unicast to a unicast communication endpoint of the plurality of communication endpoints.

The method 300 may be deployed in the interoperability system 150 shown in FIG. 1. The interoperability system 150 may thus leverage multicast networks to support media routing between unicast-based communication endpoints such as a software client running on, for example, a computer 112, functioning as a PTT management center (PMC) participating in VTGs. In an example embodiment, endpoints within a multicast domain may not support a multicast protocol may still receive the media streams. Further communication endpoints that are not within the multicast domain may receive the media streams. Similarly, the abovementioned endpoints within a multicast domain may still have their media streams broadcast to the multicast address. Further communication endpoints that are not within the multicast domain may transmit their media streams that are then included in broadcast to the multicast address. Accordingly, in the example communication system 100, both unicast and multicast communication endpoints may be added to a multimedia conference of a VTG. The interoperability system 150, in an example embodiment, may thus facilitate interoperable communication sessions between and among various communication devices, such as endpoints of communication networks and endpoint devices. The interoperability system 150 may provide a framework based on IP protocols and services to achieve secure video, voice and other data interoperability among communication endpoints and networks utilizing different technologies. For example, a VTG may be formed to allow endpoints from different communication networks to communicate with one another as though they were part of the same communication network. For example, a VTG may be formed in response to a particular situation. The situation may be dynamic, for example, a VTG formed in response to an event; or the situation may be static, for example, a VTG formed based on a particular location.

In example embodiment, some of the communication endpoints in the communication system 100, shown in FIG. 1, may receive and transmit media using the SIP protocol. In the communication system 100, SIP may operate as an application-layer control protocol that includes primitive voice establishing, modifying and terminating communication sessions. SIP may work independently of an underlying transport protocol in the communication system 100 and without dependency on the type of session that is being established. SIP may also transparently supports name mapping and redirection services, which support personal mobility of, for example, the mobile phones 108. SIP may provide a signaling protocol used for establishing sessions in the computer network 114. In an example embodiment, SIP creates, modifies and terminates two-party (unicast) or multi-party (multicast) sessions consisting of one or several medial streams. The modification can involve changing addresses or ports, inviting more participants, adding or deleting media streams, or the like.

Figure 4:
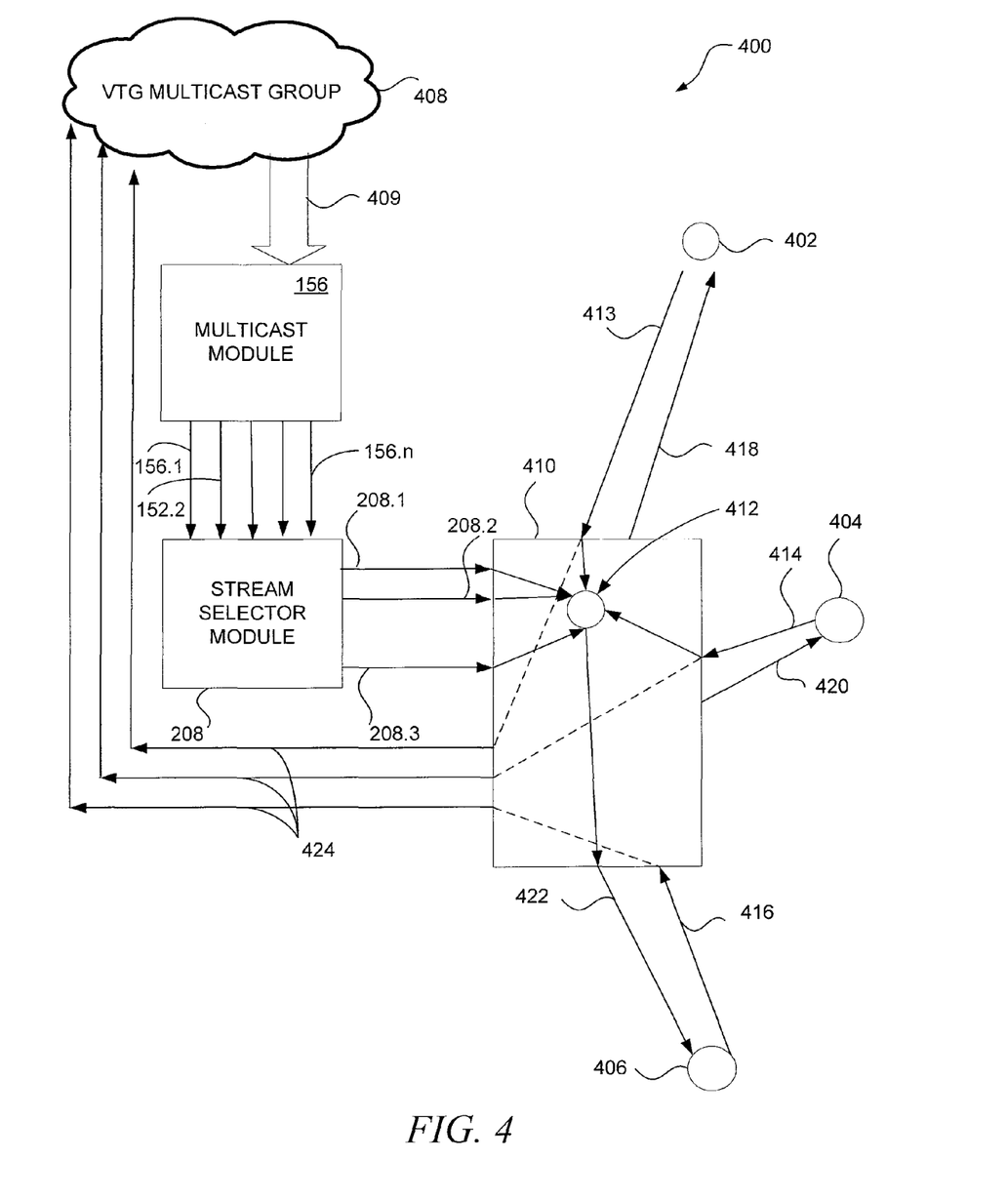
FIG. 4 depicts a simplified flow diagram of a method, in accordance with an example embodiment, in which media streams in the system of FIG. 1 are added to provide a media conference with multiple participants.

FIG. 4 depicts a simplified flow diagram of a method 400, in accordance with an example embodiment, in which media streams in the communication system 100 of FIG. 1 are added to provide a media conference with multiple participants. The method 400 is shown to conference a plurality of unicast communication endpoints 402, 404, 406 and a VTG multicast group 408. In the method 400, the unicast communication endpoints 402, 404, 406 are shown to communicate with a talk group media conference system 410 that includes a conferencing module 412 to individually add a plurality of unicast media streams into a conference of multiple participants.

Multicast packets 409 of the VTG multicast group 408, including media streams from participating multicast endpoints, are received by the multicast module 156. As hereinbefore described with reference to block 304, the multicast module 156 may inspect the multicast packets and identify individual media streams 156.1-156.$n$ corresponding to individual communication endpoints forming part of the VTG multicast group 408. The individual media streams 156.1-156.$n$ may be individually buffered in the multicast module 156 so that a media stream associated with a particular individual communication endpoint is buffered in the same logical buffer. Thereafter, the individual media streams 156.1-156.$n$ may be fed into the stream selector module 210. Based on a rule in a rules module (e.g., the rules module 212), the stream selector module 208 may select one or more of the individual media streams and feed them into the talk group media conference system 410. For example, in the method 400, three individual selected media streams 208.1-208.3 are fed into the conferencing module 412 of the talk group media conference system 410. The selected individual media streams 208.1-208.3 are fed into the conferencing module 412. It should be noted that the conferencing module 412 adds the individual media streams from the VTG multicast group 408 to the conference independently and not cumulatively. Accordingly, the identity of a media stream communicated using IP multicast may be retained at the conferencing module 412.

As the communication endpoints 402, 404, 406 are unicast communication endpoints, the talk group media conference system 410 receives individual media streams 413, 414, 416 from the unicast communication endpoints 402, 404, 406, respectively. However, media streams 418, 420 and 422 transmitted from the talk group media conference system 410 to the unicast communication endpoints 402, 404, 406 include combined media streams. For example, the media stream 418 received by the communication endpoint 402 includes a combination of an inbound media stream 414 from the communication endpoint 404, and an inbound media stream 416 from the communication endpoint 406, and the selected individual media streams 208.1, 208.2, 208.3. It should be noted, however, that the media stream 418 received by the communication endpoint 402 excludes the media stream 413 communicated from the communication endpoint 402 to the talk group media conference system 410. Likewise, the media stream 420 received by the communication endpoint 404 includes a combination of the media stream 413 from the communication endpoint 402, media stream 416 from the communication endpoint 406, and the selected individual media streams 208.1, 208.2, 208.3 de-multiplexed from the IP multicast. The media stream 422 received by the communication endpoint 406 includes a combination of the media stream 413 from the communication endpoint 402, media stream 414 from the communication endpoint 404, and the selected individual media streams 208.1, 208.2, 208.3 de-multiplexed from the IP multicast. The media streams 413, 414 and 416 are also communicated (see arrows 424) to a multicast group address of the VTG multicast group 408.

Thus, in an example embodiment, the method 400 allows interoperability between multicast communication endpoints and unicast communication endpoints in a VTG represented by a multicast group address. In the example interoperability system 150, PMCs within the same multicast domain as the multicast group address, may be able to join the VTG and thus transmit media to, and receive media from, the VTG multicast group 408. A PMC may be Microsoft Windows-based application that enables push-to-talk (PTT) functionality for PC users. Other desktop or mobile computer operating systems may be used as well. In another example embodiment, the PMC may be a thin client.

It should be noted that the use of multicast media processing in the example embodiments described herein is merely by way of illustration. In another example embodiment, the multiple media streams decomposed from a single multicast address can be attached to a media-recording server. In accordance with this example scenario, each one of the talkers may be recorded in a separate multimedia-recording server and the identity of the talker/speaker may be tagged accordingly.

Figure 5:
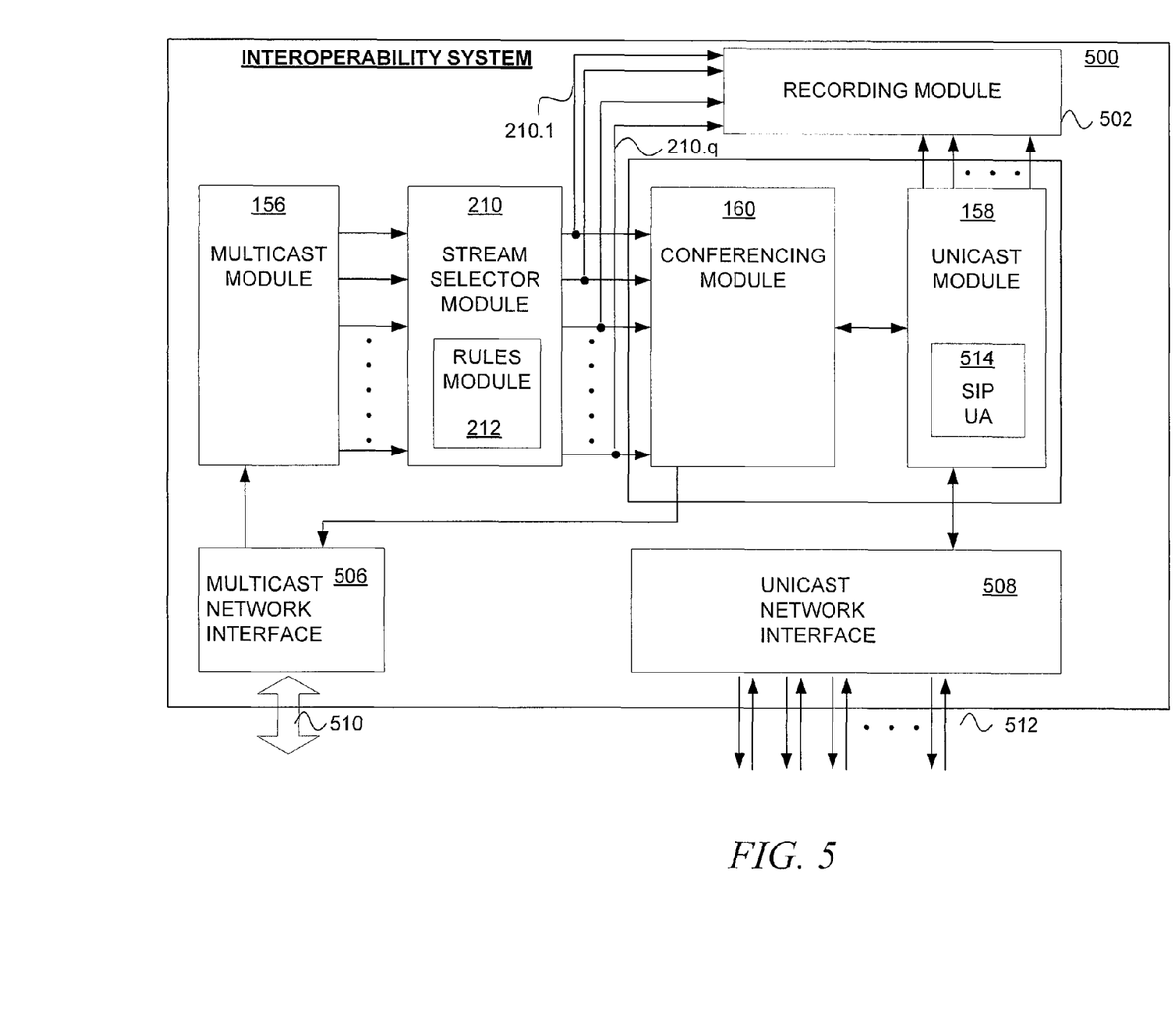
FIG. 5 depicts a schematic diagram of an interoperability system, in accordance with an example embodiment, to provide conferencing functionality in which individual media streams communicated in multicast packets are individually buffered.

FIG. 5 depicts a schematic diagram of an interoperability system 500, in accordance with an example embodiment, to provide conferencing functionality in which individual media streams communicated in multicast packets are individually recorded. The interoperability system 500 may be substantially similar to the interoperability system 150, shown in FIG. 1, and include features of the apparatus 200, shown in FIG. 2. Accordingly, like references are used to indicate the same or similar features.

The interoperability system 500 is shown to include a multicast module 156, a stream selector module 210 including a rules module 212, a recording module 502, a conferencing module 160, a unicast module 158, a multicast network interface 506, and a unicast network interface 508. The multicast network interface 506 is configured to allow multicast communications between the interoperability system 500 and a VTG multicast group (e.g., the VTG multicast group 408) as shown by arrow 510. The unicast network interface 508 is configured to allow unicast communications between the interoperability system 500 and a plurality of unicast communication endpoints (e.g., the unicast communication endpoints 402, 404 and 406) as shown by arrows 512. In an example embodiment the unicast and multicast media streams and the associated signaling may travel via the same computer network 114.

In an example embodiment, unicast communication endpoints may join a VTG by establishing SIP dialogues with a SIP user agent (UA). Accordingly, as shown in FIG. 5, the unicast module 158 includes a SIP UA 514 to establish communications between the interoperability system 500 and a plurality of unicast communication endpoints (e.g., the communication endpoints 402, 404 and 406).

In an example embodiment, the multicast module 156 may issue an IGMP join to a multicast address of a VTG and, accordingly, start receiving all IP multicast traffic associated with the VTG. For example, in FIG. 4, the multicast module 156 may issue an IGMP join to the VTG multicast group 408 so that it receives associated multicast packets 409. In an example embodiment, the multicast module 156 may receive every packet sent to a VTG multicast group address. In the example method 400 shown in FIG. 4, the multicast packets received by the multicast module 156 include packets communicating the individual media streams 413, 414 and 416. In order to identify the individual media streams, identifiers in an RTP/RTCP protocol may be used.

Figure 6:
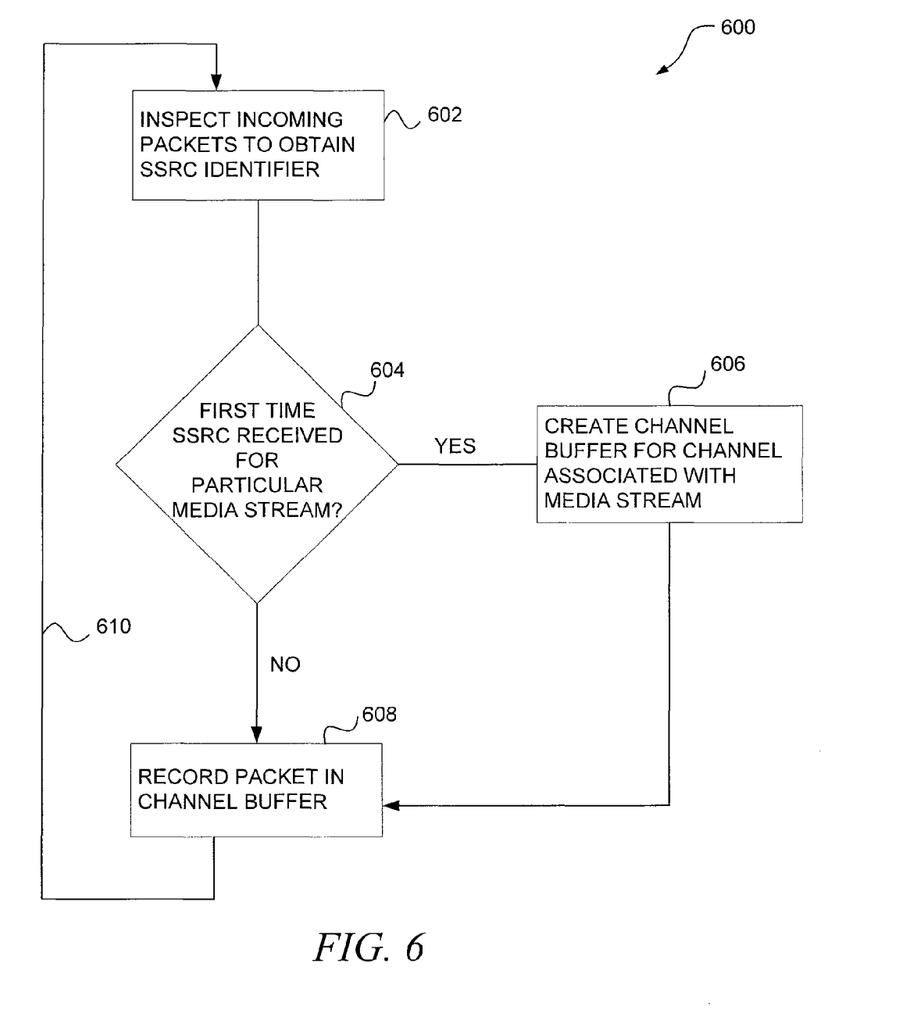
FIG. 6 depicts a flow diagram of a general overview of a method, in accordance with an example embodiment, for storing individual media streams in a buffer based on a synchronization source (SSRC) identifier in a real time protocol (RTP) header.
Figure 7:
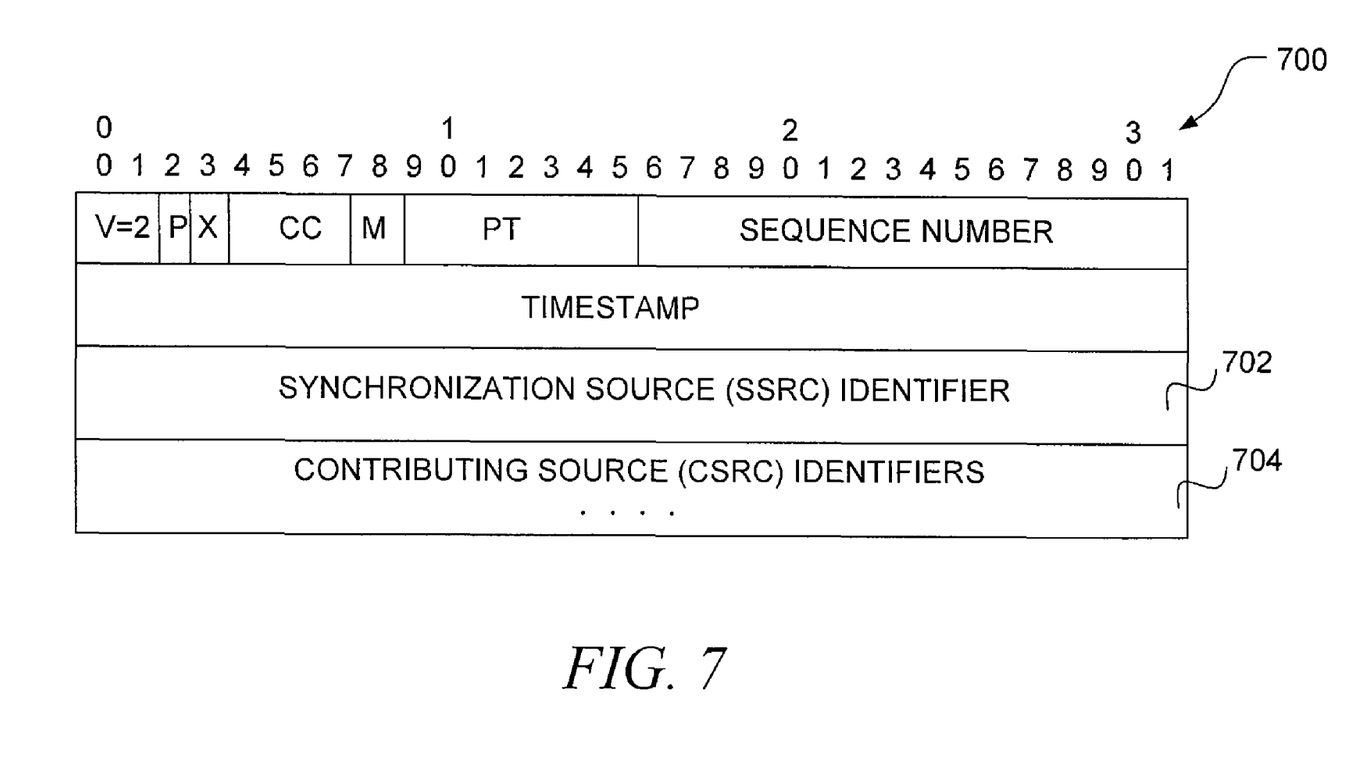
FIG. 7 depicts an example RTP header showing the SSRC identifier.

Returning to FIG. 3, at block 304 the method 300 is shown to inspect the multicast packets from a given multicast address to identify each individual media stream with which the packet is associated. An example method 600, in accordance with the invention, for identifying each individual media stream is shown in FIG. 6. In an example embodiment, the method 600 records individual media streams (e.g., in memory, on hard disk or in any other storage media) based on a synchronization source (SSRC) identifier 702 in a real time protocol (RTP) header 700 (see FIG. 7). The RTP header 700 is shown to include the SSRC identifier 702 and a contributing source (CSRC) identifier 704. The RTP header 700 was developed by the Audio-Video Transport Working Group of the IETF and first published in 1996 as RFC 1889. The SSRC and CSRC are defined in the IETF RFC 3550.

The SSRC provides the source of a stream of RTP packets, identified by a 32-bit numeric SSRC identifier carried in the RTP header. The SSRC identifier is a randomly chosen value meant to be globally unique within a particular RTP session. A participant need not use the same SSRC identifier for all the RTP sessions in a multimedia session; the binding of the SSRC identifiers is provided through RTCP. If a participant generates multiple streams in one RTP session, for example from separate video cameras, each must be identified as a different SSRC.

The CSRC is a source of a stream of RTP packets that has contributed to the combined stream produced by an RTP mixer. The mixer inserts a list of the SSRC identifiers of the sources that contributed to the generation of a particular packet into the RTP header of that packet. This list is called the CSRC list. An example application is audio conferencing where a mixer indicates all the talkers whose speech was combined to produce the outgoing packet, allowing the receiver to indicate the current talker, even though all the audio packets contain the same SSRC identifier.

In an example embodiment, the method 300 comprises identifying a participant associated with an individual media stream based on the CSRC, and displaying a name of the participant. For example, the name of the participant may be displayed on a monitor an emergency response control console. Further, in an example embodiment, the method 300 may record, separately for each individual media stream of the plurality of media streams, each individual media stream and meta data associated with the individual. The meta data may comprise a name of a participant in a multimedia conference.

The method 600 may be performed on each incoming packet received by the multicast module 156, shown in FIG. 5. As shown at block 602, incoming packets associated with the VTG multicast group are inspected to obtain an SSRC identifier 702, shown in FIG. 7. Thereafter, at decision block 604, if it is determined that it is the first time the SSRC is received for a particular media stream, then a channel buffer is created for a channel associated with the individual media stream (see block 606). Thereafter, the packet is recorded using the particular channel buffer as shown at block 608. If, however, it is not the first time the SSRC is received for a particular media stream, then the method 600 progresses directly from decision block 604 to block 608 where the packet is recorded in a particular channel. As shown by arrow 610, the method 600 is performed on each packet sent to the multicast group. Accordingly, in an example embodiment, the multicast module 156 may have as many channel buffers as there are number of unique media streams in a VTG associated with a multicast group. Thus, the multicast module 156 may be continuously listening for traffic on a multicast group address and keep de-multiplexing the traffic into appropriate channel buffers based on the SSRC identifier 702 for the life of the VTG.

Returning to FIG. 5, in an example embodiment the SIP UA 514 allows unicast communication endpoints such as PTT radios 154, managed by a PMC, to join VTGs hosted by the interoperability system 500. In an example embodiment, a unicast communication endpoint (e.g., the unicast communication endpoint 402, 404 or 406) may establish a SIP dialogue with the SIP UA 514. The SIP dialogue may be established directly with VoIP phones that support the SIP protocol, or with PSTN and cellular phones via a gateway that supports SIP. Other gateways and protocol translators may be used as well for phone that do not support SIP directly. A request URI of a SIP invite may identify the VTG that the unicast communication endpoint wants to join. For example, in the method 400 of FIG. 4, the unicast communication endpoints 402, 404 and 406 may send SIP invites identifying the VTG multicast group 408. In an example embodiment, the media capabilities of the unicast communication endpoint 402, 404 and/or 406 may be taken into account when establishing communications between the unicast communication endpoint 402, 404 and/or 406 and the interoperability system 500. For example, the method 300 of FIG. 3 may optionally include operations to identify the media capabilities of the unicast communication endpoint 402, 404 and/or 406. In an example embodiment, the method 300 may receive a request from a unicast communication endpoint (e.g., unicast communication endpoints 402, 404 or 406) for a combined media stream. Thereafter, two or more individual media streams may be combined to provide a combined media stream that may then be unicast to the unicast communication endpoint (e.g., unicast communication endpoints 402, 404 or 406). An example of such a communication is the media stream 418 communicated between the talk group media conference system 410 and the unicast communication endpoint 402. In addition, or instead, a unicast communication endpoint (e.g., the unicast communication endpoints 402, 404 or 406) may request individual media streams from the interoperability system 500. Accordingly, a method 300 may include receiving a request from a unicast communication endpoint (e.g., the unicast communication endpoints 402, 404 or 406) for at least two individual media streams that are then unicast independently to the communication endpoint (e.g., the unicast communication endpoints 402, 404 or 406). Thus, in an example embodiment, individual media streams and/or combined media streams may be communicated to a unicast communication endpoint based on the media capabilities of a communication endpoint (e.g., capabilities of unicast communication endpoints 402, 404 and 406). In an example embodiment, a Session Description Protocol (SDP) offer included in a SIP invite describing the media the unicast communication endpoint is prepared to receive.

In an example embodiment, the media is a single RTP/RTCP stream derived from mixing of individual media streams. A single media stream may be communicated to a unicast IP address and port specified by the unicast communication endpoint. However, in contrast to conventional conferences systems, the unicast communication endpoints 402, 404 and 406 may negotiate with the SIP UA 514 of the interoperability system 500 as to the media capabilities of the unicast communication endpoint and thus the type of media the unicast communication endpoint is to receive. The unicast communication endpoints 402, 404 and 406 may then present the individual media streams to a user as required by the user. In an example embodiment, the unicast communication endpoints 402, 404 and 406 and the SIP UA 514 negotiate this through an experimental SDP attribute. For example, the experimental SDP attribute may be:

a=proxy-mix[none|group|all]

where,
"none" stipulates no mixing, "group" stipulates mix all the individual streams, and "all" stipulates mix all individual media streams associated with a VTG.

In an example embodiment, including the proxy-mix attribute in the SDP indicates support for the proxy-mix field and the values it may be assigned. The value assigned to the proxy-mix field indicates whether or not mixing is desired. Example SDPs include:
a) No proxy-mix attribute: This may indicate a lack of support for the negotiation of proxy mixing.
   v=0
   o=ums-sipua-0.1 1 1 IN IP4 172.19.127.104
   s=-
   c=IN IP4 172.19.127.104
   t=0 0
   m=audio 24680 RTP/AVP 0 101
   a=rtpmap:0 PCMU/8000
   a=rtpmap:101 telephone-event/8000
   a=fmtp:101 0-15
   a=sendrecv
b) proxy-mix attribute: none: This may indicate that media streams within a VTG should be forwarded without any mixing being performed.
   v=0
   o=ums-sipua-0.1 1 1 IN IP4 172.19.127.104
   s=-
   c=IN IP4 172.19.127.104
   t=0 0
   m=audio 24680 RTP/AVP 0 101
   a=rtpmap:0 PCMU/8000
   a=rtpmap:101 telephone-event/8000
   a=fmtp:101 0-15
   a=sendrecv
   a=proxy-mix:none
c) proxy-mix attribute: group: This may indicate that all streams within the talk group should be mixed and forwarded as a single stream. In this case, the SSRC identifies the mixer, and the CSRCs identify the contributing sources to the mixed stream.
   v=0
   o=ums-sipua-0.1 1 1 IN IP4 172.19.127.104
   s=-

```
c=IN IP4 172.19.127.104
t=0 0
m=audio 24680 RTP/AVP 0 101
a=rtpmap:0 PCMU/8000
a=rtpmap:101 telephone-event/8000
a=fmtp:101 0-15
a=sendrecv
a=proxy-mix: group
```

Accordingly, in an example embodiment, a communication endpoint may identify the composition of media stream for which it requires the interoperability system 500 to act as a proxy mixer.

In an example embodiment, the conferencing module 160, shown in FIGS. 1 and 5, may be a conventional conferencing module that is configured to add unicast-based participants that are expected to send only a single media stream to the conferencing module 160. However, in the interoperability system 500 of FIG. 5, media streams from communication endpoints that are broadcast to a multicast group address are de-multiplexed or separated, in accordance with an example embodiment, into individual media streams, which may then be added individually to a conference facilitated by the conferencing module 160. Similarly, the sender of the de-multiplexed media streams can be identified and the media streams may be recorded separately along with the name of the speaker by the recording module 502. Accordingly, the conferencing module 160 does not receive a combined or multiplexed media stream of all media communicated by the multicast packets. It should be noted that the conferencing module 160 may thus treat each of the individual media streams (e.g., the selected individual media streams 208.1-208.3) as if they represent media streams received from unicast communication endpoints. The individual media streams are then added to a media conference at the conferencing module 160.

In an example embodiment, the interoperability system 500 of FIG. 5, may distinguish multicast communication endpoints from unicast communication endpoints. The distinction may, for example, be obtained from the manner in which media stream is sent back from the interoperability system 500 to the communication endpoints. As shown in the method 400 of FIG. 4, the unicast based endpoints 402, 404 and 406 may require either a single mixed stream that mixes all other media streams except the media stream sent by a conference participant itself, or multiple streams without mixing as negotiated in a SDP exchange with the SIP UA 514.

In an example embodiment, the rules module 212 of the interoperability system 500 of FIG. 5 may provide rules for managing or treating the de-multiplexed individual media streams 156.1-156.n. For example, the rules may provide talker ID-based filtering in which the de-multiplexed RTCP may be inspected to identify a talker ID (e.g., the canonical name or CNAME field in the RTP packets). In an example embodiment, a policy may be enforced based on a talker ID. For example, certain participants may be allowed to participate as listen-only participants. It is, however, to be appreciated that any other action(s) or conditions may be applied to participants based on the rules. Although the rules module 212 is shown by way of example to form part of the stream selector module 210, it is to be appreciated that the rules module 212 may be provided in other parts of the interoperability system 500. In an example embodiment, the rules in the rules module 212 may identify a priority or preemption for participants in a media conference. For example, de-multiplexed RTP/RTCP media streams may be prioritized based on priority/preemption rules. For example, individual media streams with a higher priority may be selected and fed into the conferencing module 160. Individual media streams with a lower priority may be discarded by the stream selector module 210. Accordingly, in an example embodiment, the stream selector module 210 allows individual media streams generated from multicast packets to be selectively fed into the conferencing module 160 in accordance with policy reflected by the rules module 212.

The recording module 502 receives selected individual media streams (e.g., the selected individual media streams 210.1-210.q so that they can be recorded independently. Additionally, the identity of each speaker may be provided to the recording module 502 and recorded accordingly to provide the identity of each speaker for future reference. Accordingly, unlike a conventional audio conferencing system where combined or multiplexed media streams are provided as a single feed into a conference recorder, the individual de-multiplexed media streams in the interoperability system 500 allows each individual media stream communicated by multicasting to be recorded. Communication endpoints communicating via a unicast protocol and a multicast protocol can be conferenced into the same VTG without losing control over individual multicast streams.

Figure 8:
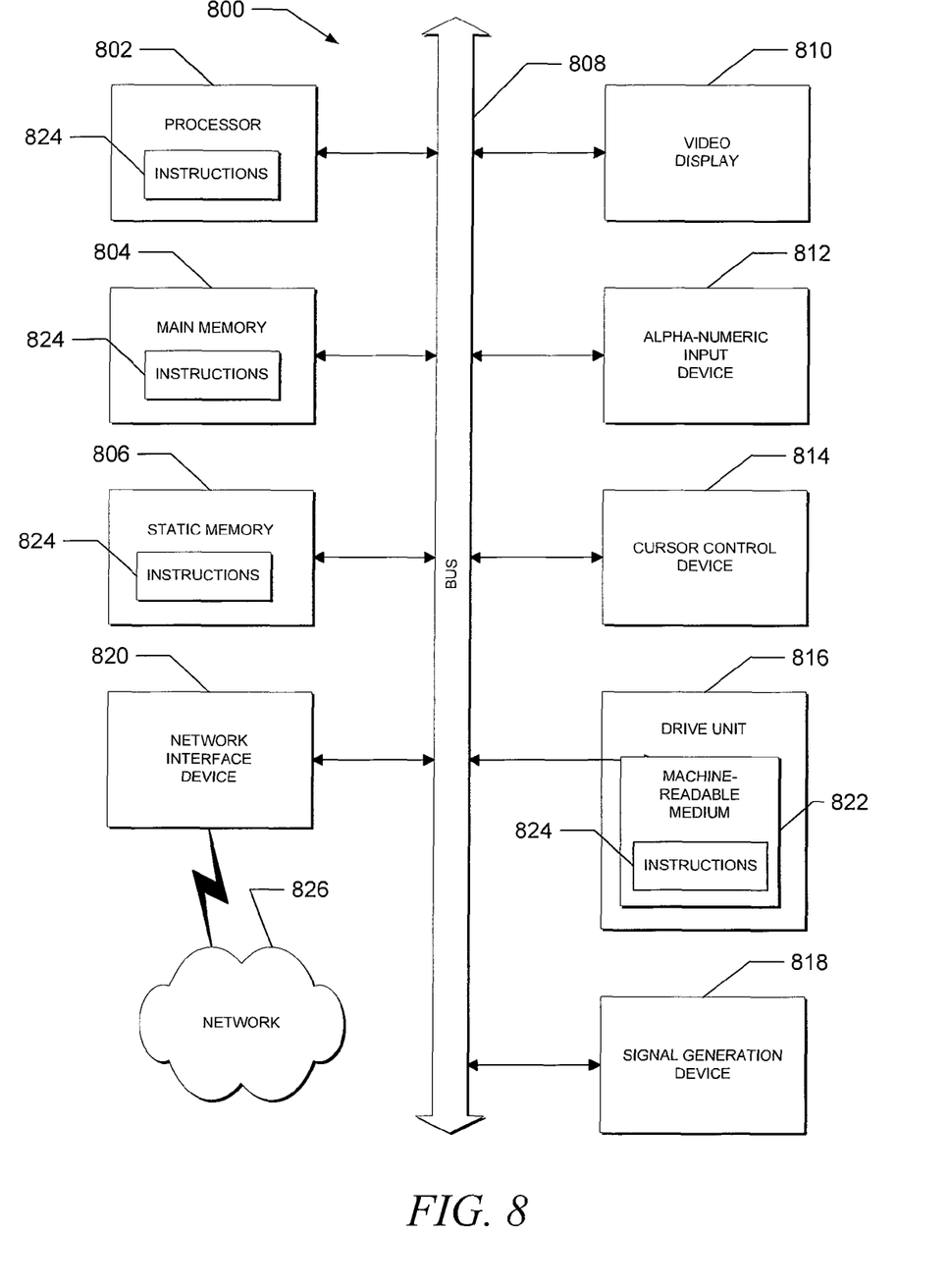
FIG. 8 is a simplified block diagram of a machine in the example form of a computing system within which a set of instructions, for causing the machine to perform any one or more of the methodologies discussed herein, may be executed.

FIG. 8 is a simplified block diagram of a machine in the example form of a computing system within which a set of instructions for causing the machine to perform any one or more of the methodologies discussed herein may be executed. In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 800 includes a processor 802 (e.g., a central processing unit (CPU), a graphics processing unit (GPU) or both), main memory 804 and static memory 806, which communicate with each other via bus 808. The computing system 800 may further include video display unit 810 (e.g., a plasma display, a liquid crystal display (LCD) or a cathode ray tube (CRT)). The computing system 800 also includes alphanumeric input device 812 (e.g., a keyboard), user interface (UI) navigation device 814 (e.g., a mouse), disk drive unit 816, signal generation device 818 (e.g., a speaker), and network interface device 820.

A disk drive unit 816 includes machine-readable medium 822 on which is stored one or more sets of instructions and data structures (e.g., instructions 824) embodying or used by any one or more of the methodologies or functions described herein. Software 824 may also reside, completely or at least partially, within main memory 804 and/or within the processor 802 during execution thereof by the computing system 800, with the main memory 804 and the processor 802 also constituting machine-readable, tangible media. Software 824 may further be transmitted or received over a network 826 via a network interface device 820 using any one of a number of well-known transfer protocols (e.g., Hypertext Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that causes the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
receiving multicast packets communicating a plurality of individual media streams from a plurality of communication endpoints including multicast communication endpoints and unicast communication endpoints, each communication endpoint having an associated individual media stream;
inspecting the multicast packets to identify each individual media stream with which each packet is associated by de-multiplexing a multiplexed media stream that is included in the multicast packets;
using identifiers in the multicast packets to identify the individual media streams, the identifiers identifying the multicast communication endpoints and the unicast communication endpoints associated with the individual media streams;
individually processing each individual media stream by buffering each individual media stream in an associated buffer;
selecting at least one individual media stream from buffers that are associated with the multicast communication endpoints;
receiving unicast packets corresponding to unicast media streams from a plurality of unicast communication endpoints;
selecting at least one unicast media stream to send to a first unicast communication endpoint;
generating a first combined media stream by combining the at least one selected individual media stream and the at least one selected unicast media stream; and
unicasting the first combined media stream to the first unicast communication endpoint.

2. The method of claim 1, further comprising identifying media capabilities of the first unicast communication endpoint.

3. The method of claim 2, wherein identifying media capabilities of the first unicast communication endpoint comprises:
receiving a request from the first unicast communication endpoint for a second combined media stream;
combining two or more individual media streams to provide the second combined media stream; and
unicasting the second combined media stream to the first unicast communication endpoint.

4. The method of claim 2, wherein identifying media capabilities of the first unicast communication endpoint comprises:
receiving a request from the first unicast communication endpoint for at least two individual media streams; and
unicasting the at least two individual media streams to the first unicast communication endpoint.

5. The method of claim 2, wherein identifying media capabilities of the first unicast communication endpoint comprises receiving a Session Distribution Protocol (SDP) attribute from the first unicast communication endpoint.

6. The method of claim 1, further comprising inserting at least one contributing resource identifier (CSRC) into a real time protocol (RTP) header to identify a source of each individual media stream.

7. The method of claim 6, further comprising:
identifying a participant associated with an individual media stream based on the CSRC; and
displaying a name of the participant.

8. The method of claim 1, further comprising recording, separately for each individual media stream of the plurality of media streams, each individual media stream and meta data associated with the individual media stream.

9. The method of claim 8 wherein the meta data comprises a name of a participant in a multimedia conference.

10. The method of claim 1, comprising inspecting each multicast packet received to identify the individual media stream using a SSRC field.

11. The method of claim 1, wherein the plurality of media streams form part of a virtual talk group (VTG).

12. The method of claim 1, wherein the plurality of media streams are audio streams in an audio conference.

13. The method of claim 1, further comprising adding each individual media stream into an audio conference as a separate participant.

14. The method of claim 1, further comprising:
for a particular unicast communication endpoint,
combining the individual media streams other than a media stream of the particular unicast communication endpoint into a particular combined media stream, and
unicasting the particular combined media stream to the particular unicast communication endpoint; and
for multicast communication endpoints, multicasting the individual media streams to a multicast address.

15. The method of claim 1, comprising:
identifying a participant associated with an individual media stream of the plurality of media streams;
using a rules database providing rules associated with one or more participants to identify a rule associated with the identified participant; and
enforcing the rule with respect to the identified participant.

16. The method of claim 15, wherein the rule includes configuring a communication endpoint associated with the identified participant as listen only communication endpoint.

17. The method of claim 15, wherein the rule includes prioritizing a media stream associated with the identified participant.

18. The method of claim 1, further comprising communicating each individual media stream separately to a recording device to record each media stream independently.

19. The method of claim 1, further comprising:
buffering each individual stream in its own associated buffer; and
unicasting the individual media stream from its own associated buffer.

20. An apparatus comprising:
at least one processor; and
a memory in communication with the at least one processor, the memory being configured to store instructions executable by the at least one processor, the instructions when executed performing operations comprising:
receiving multicast packets communicating a plurality of individual media streams from a plurality of communication endpoints including multicast communication endpoints and unicast communication endpoints, each communication endpoint having an associated individual media stream;
inspecting the multicast packets to identify each individual media stream with which each packet is associated by de-multiplexing a multiplexed media stream that is included in the multicast packets;
using identifiers in the multicast packets to identify the individual media streams, the identifiers identifying the multicast communication endpoints and the unicast communication endpoints associated with the individual media streams;
individually processing each individual media stream by buffering each individual media stream in an associated buffer;
selecting at least one individual media stream from buffers that are associated with the multicast communication endpoints;
receiving unicast packets corresponding to unicast media streams from a plurality of unicast communication endpoints;
selecting at least one unicast media stream to send to a first unicast communication endpoint;
generating a first combined media stream by combining the at least one selected individual media stream and the at least one selected unicast media stream; and
unicasting the first combined media stream to the first unicast communication endpoint.

21. The apparatus of claim 20, wherein the operations further comprise identifying media capabilities of the first unicast communication endpoint.

22. The apparatus of claim 21, wherein identifying media capabilities of the first unicast communication endpoint comprises:
receiving a request from the first unicast communication endpoint for at least two individual media streams; and
unicasting the at least two individual media streams to the first unicast communication endpoint.

23. The apparatus of claim 21, wherein identifying media capabilities of the first unicast communication endpoint comprises receiving a Session Distribution Protocol (SDP) attribute from the first unicast communication endpoint.

24. The apparatus of claim 20, further comprising inserting at least one contributing resource identifier (CSRC) into a real time protocol (RTP) header to identify a source of each individual media stream.

25. An apparatus comprising:
a receiver module to receive multicast packets communicating a plurality of media streams from a plurality of communication endpoints including multicast communication endpoints and unicast communication endpoints, each communication endpoint having an associated individual media stream;
means for inspecting the multicast packets to identify each individual media stream with which each packet is associated by de-multiplexing a multiplexed media stream that is included in the multicast packets;
means for using identifiers in the multicast packets to identify the individual media streams, the identifiers identifying the multicast communication endpoints and the unicast communication endpoints associated with the individual media streams;
means for individually processing each individual media stream by buffering each individual media stream in an associated buffer;
means for selecting at least one individual media stream from buffers that are associated with the multicast communication endpoints;
means for receiving unicast packets corresponding to unicast media streams from a plurality of unicast communication endpoints;
means for selecting at least one unicast media stream to send to a first unicast communication endpoint;
means for generating a first combined media stream by combining the at least one selected individual media stream and the at least one selected unicast media stream; and
a unicast module to unicast the first combined media stream to the first unicast communication endpoint.

26. The method of claim 1, wherein individually processing each media stream includes creating a new buffer for a channel when an SSRC identifier is received a first time for a particular media stream.

27. The apparatus of claim 20, wherein individually processing each media stream includes creating a new buffer for a channel when an SSRC identifier is received a first time for a particular media stream.

28. The method of claim 1, wherein receiving the multicast packets includes receiving multicast packets directed to a first multicast address, and the method further comprises:
multicasting values from the unicast media streams to the first multicast address.

29. The method of claim 1, wherein the at least one selected unicast media stream is not from the first unicast communication endpoint.

30. The method of claim 1, wherein selecting at least one individual media stream includes selecting an individual media stream associated with a current speaker in a communication session corresponding to the individual media streams.

* * * * *

UNITED STATES PATENT AND TRADEMARK OFFICE
CERTIFICATE OF CORRECTION

PATENT NO. : 8,107,403 B2
APPLICATION NO. : 12/188993
DATED : January 31, 2012
INVENTOR(S) : Amit P. Barave et al.

Page 1 of 1

It is certified that error appears in the above-identified patent and that said Letters Patent is hereby corrected as shown below:

In column 16, line 9, in Claim 25, before "media" insert -- individual --.

In column 16, line 41, in Claim 26, before "media" insert -- individual --.

In column 16, line 45, in Claim 27, before "media" insert -- individual --.

Signed and Sealed this
Twenty-fourth Day of April, 2012

David J. Kappos
*Director of the United States Patent and Trademark Office*